INVENTOR
M. E. SIKORSKI
BY
ATTORNEY

July 8, 1969     M. E. SIKORSKI     3,454,845

SEMICONDUCTIVE TRANSDUCERS

Original Filed July 7, 1966     Sheet 5 of 7

United States Patent Office 3,454,845
Patented July 8, 1969

3,454,845
SEMICONDUCTIVE TRANSDUCERS
Mathew E. Sikorski, New Providence, N.J., assignor to Bell Telephone Laboratories Incorporated, New York, N.Y., a corporation of New York
Original application July 7, 1966, Ser. No. 574,521, now Patent No. 3,372,244, dated Mar. 5, 1968, which is a division of application Ser. No. 282,792, May 23, 1963, now Patent No. 3,312,790, dated Apr. 4, 1967. Divided and this application Aug. 31, 1967, Ser. No. 695,530
Int. Cl. H01l *1/00, 5/00*
U.S. Cl. 317—235
3 Claims

ABSTRACT OF THE DISCLOSURE

The disclosure is directed to electromechanical transducers in which stress is applied in various ways to one or both junctions of a transistor. Several device configurations are disclosed which are designed to increase the efficiency of translation of the stress to the junction. One configuration includes circular emitter-base junctions with circular indentors for applying stress. Another involves mounting a relatively small transistor at the center of a large flexible diaphragm between stress-applying means, preferably of the mentioned type. Still another concerns building a two-junction transistor at the center of a circular semiconductive diaphragm with suitable stress-applying means.

---

This application is a division of application Ser. No. 574,521, filed July 7, 1966, by M. E. Sikorski, which application is a division of U.S. Patent No. 3,312,790, issued Apr. 4, 1967, to M. E. Sikorski, Ser. No. 282,792, May 23, 1963.

This invention relates to semiconductive devices. More particularly, it relates to semiconductive devices including p-n junctions and the responses of the devices to mechanical stress.

In my joint application with P. Andreatch, Jr., Ser. No. 216,456, filed Aug. 13, 1962, abandoned 1965, it is disclosed that transistors are sensitive to mechanical stressing of the emitter region, where the stress is concentrated at a point of small area as, for example, when applied directly to the emitter region by a small spherical indenter of a hard material, such as diamond, pressing upon a point well within the boundaries of the emitter region.

The results of further investigations of this phenomenon are discussed hereinunder and new and modified arrangements involving the application of stress to semiconductive devices are suggested which afford enhanced operational characteristics. Inasmuch as this application relates to a continuation of the research upon which my above-mentioned joint application is based, the joint application is incorporated herein by reference and its disclosure is made an integral part of the disclosure of the present application insofar as it is pertinent.

A principal object of the invention is, accordingly, to improve the stress-responding characteristics of semiconductive transducing devices having one or more p-n junctions therein.

A further object is to improve the characteristics of transistor microphones, transducers of semiconductive material, and the like.

The above and further objects, features and advantages of the invention will become apparent from a perusal of the following detailed descriptions of illustrative arrangements of the invention in conjunction with the accompanying drawing, in which.

Figure 23:
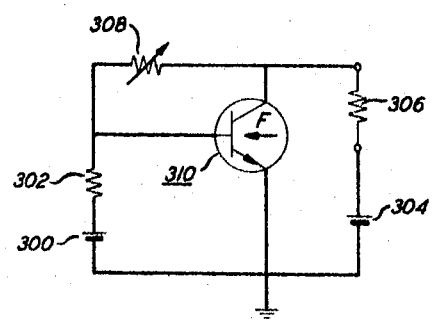

FIGS. 19 through 22, inclusive, illustrate so-called "stress-raiser" structures employed so as to increase the stress applied to the various stress-sensitive regions of a transistor; and FIG. 23 illustrates in schematic diagram form a further circuit arrangement offering particular advantages for use with structures of the invention.

Figure 1:
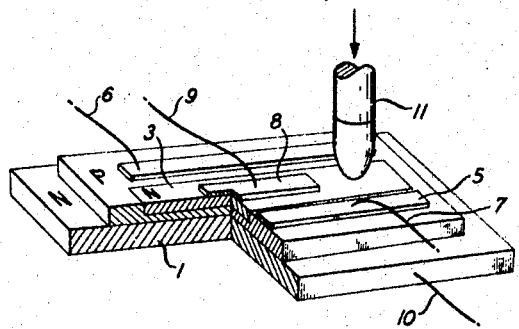
FIG. 1 illustrates an arrangement of my above-mentioned joint application in which the sensitivity of the emitter region of a transistor to stress is utilized.

In more detail in FIG. 1, a structure substantially as disclosed and described in my above-mentioned joint application with P. Andreatch, Jr. is shown.

To recapitulate the above-mentioned prior description, region 3 is the emitter region of the transistor and is, for example, of n-type conductivity. It may, for example, have been diffused into the base region 2 of p-type conductivity thus forming a p-n junction between the two regions. Finally, a collector region 1 of n-type conductivity makes a second p-n junction with the major face of the base region opposite that in which the emitter region is situated, all as shown.

Metallic electrode 8 on emitter region 3 permits the electrical connection of lead 9 to the emitter region. Similarly, metallic electrodes 4 and 5 on the base region 2 permit the electrical connection of leads 6 and 7 respectively to the base region. Finally, lead 10 makes an ohmic connection to the collector region 1.

A small pointed needle-like member 11 of very hard material, such as diamond, hard steel, or the like, is then employed to impress a vertically oriented stress directly upon a point of the emitter region 3 spaced from the metallic electrode 8 substantially as shown. The application of stress over a large portion of the total area of the uppermost surface of the emitter region or even localized stress impressed upon points on the metallized electrode 8 were found to produce little if any response from the transistor to the applied stress.

The showing of FIG. 1 is made to a greatly enlarged scale for the purpose of clearer illustration since, as is well known to those skilled in the art, transistors are normally of very small over-all dimensions.

Figure 2A:
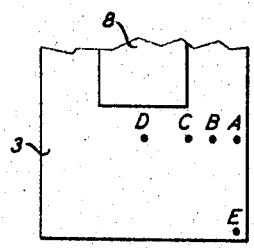
FIGS. 2A and 2B are showings employed in explaining a course of experiments conducted to more fully develop the stress-sensitivity characteristics of the emitter region of a transistor.

In FIG. 2A a still further enlarged showing of a portion of the right end of the emitter region 3 of the device of FIG. 1 with a portion of the end of metallic electrode 8 thereon is given and points A, B, C, D and E are marked thereon to represent points at which applicator 11 was successively located in an investigation of the effects of applying stress to the emitter region. Point D corresponds substantially to the point upon which applicator 11 impinges in the showing of FIG. 1.

Figure 3:
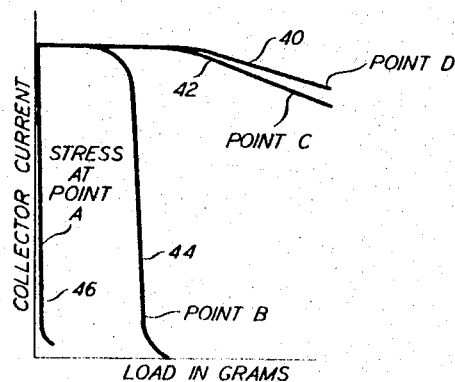
FIG. 3 illustrates the collector current versus load characteristics of a particular transistor to specific modes of stress application.

The relative sensitivities of the emitter region to the impressed stress, as applied to the above-mentioned points A, B, C and D, are indicated by the curves of FIG. 3 showing the characteristics of collector current versus load in grams for a device similar except for the point of stress application to that illustrated in FIG. 1. Curve 40 corresponds to location D; curve 42 corresponds to location C; curve 44 corresponds to location B; and curve 46 corresponds to location A. At point E even greater sensitivity than at point A was observed, however, it was scarcely feasible to illustrate its characteristic curve to the same scales as are employed for curves 40 through 46 of FIG. 3. Such a curve would of course be to the left of curve 46 and would be nearly vertical.

Figure 2B:
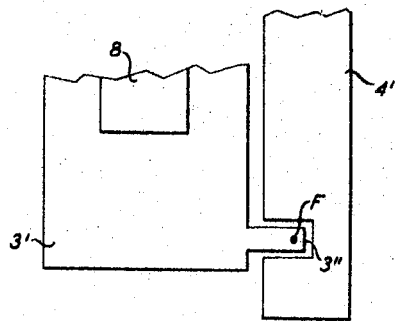

A still further enhancement of the sensitivity can be obtained by the modification illustrated in FIG. 2B where the emitter region 3' has a small projection 3'' surrounded by the modified metallic base terminal 4', as shown, and pressure is applied at point F on projection 3''.

It is concluded from these and related tests that the vertical edges of the emitter region are responsible for the major portion of the response of the transistor to stress applied by a vertically aligned indenter to the upper face of the emitter region as illustrated in FIG. 1. It further appears that with respect to the edges of the emitter region the stress is in the nature of a localized shearing stress, particularly since in positions E and F larger though still very limited portions of the total emitter edge are subjected to the stress and more sensitivity results.

Figure 4:
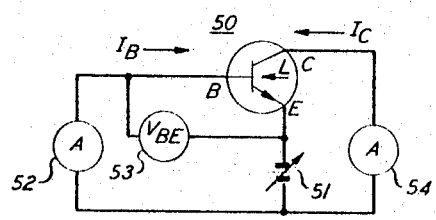
FIG. 4 illustrates in schematic diagram form a circuit arrangement for demonstrating particular stress-sensitive characteristics of a transistor.

In FIG. 4 an electrical schematic diagram of a circuit is shown by the use of which the transistor characteristics displayed in the various and sundry figures of the application may be obtained. The transistor 50 has base connection B, emitter connection E and collector connection C, respectively, as indicated. The arrow L represents the mechanical load or stress impressed upon the transistor. Ammeter 52 obviously measures the base current, ammeter 54 obviously measures the collector current and voltmeter 53 obviously measures the voltage between the base and the emitter. The voltmeter obviously can be, alternatively, interconnected between the collector and emitter to measure the voltage between them. A variable voltage source 51 provides the power for the circuit.

Source 51 should also be adjustable to a high impedance for "constant current" operation or, alternatively, to a low impedance for constant voltage operation in accordance with principles well known and extensively employed by those skilled in the art. Load or stress L, represented by the arrow so designated as mentioned above, is applied to the emitter base junctions at various positions, as specified in each instance, or, alternatively, in specific instances to the base collector junction or to both junctions as will be more fully discussed for specific arrangements described in detail hereinunder.

Figure 5:
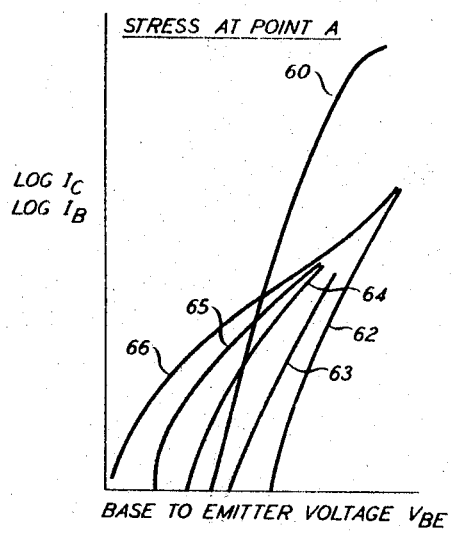
FIG. 5 illustrates the collector and base current logarithms versus base-to-emitter voltage characteristics of a transistor for a number of specific load conditions.

In FIG. 5, curves obtained with the indenter 11 of FIG. 1 at position A of FIG. 2A are shown. The vertical scale is logarithmic. The horizontal scale is linear. This choice of scales was selected since it results in more nearly straight line characteristics being obtained. Curve 62 represents the variation of the logarithm of the base current $I_B$ with base-to-emitter voltage $V_{BE}$ when no stress is applied to the transistor. Curves 63 through 66, inclusive, show the changes in the logarithm of the base current $I_B$ with base-to-emitter voltage $V_{BE}$ for loads of one, two, three and four grams, respectively. Curve 60 reprsents the change in the logarithm of the collector current $I_C$ with base-to-emitter voltage $V_{BE}$. $I_C$ does not appreciably change its general locus for very small loads, that is, with loads up to four grams maximum applied to point A of the emitter region.

Figure 6:
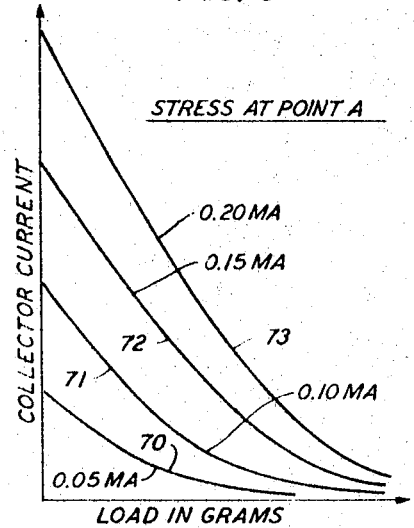
FIG. 6 illustrates collector current versus load characteristics of a transistor for various base current values and one particular mode of stress application.

In FIG. 6 curves 70 through 73, inclusive, illustrate changes in collector current versus load in grams for base currents $I_B$ of 0.05, 0.10, 0.15 and 0.20 milliamperes respectively with the indenter 11 of FIG. 1 located at point A of FIG. 2A.

Figure 7:
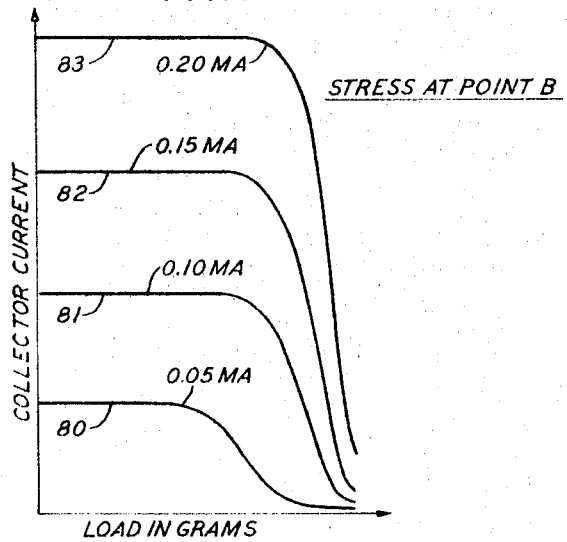
FIG. 7 illustrates collector current versus load characteristics of a transistor for various base current values and a second particular mode of stress application.

In FIG. 7 curves 80 through 83, inclusive, correspond to curves 70 through 73, inclusive, respectively of FIG. 6 except that the indenter 11 of FIG. 1 is located at points of FIG. 2A.

Figure 8:
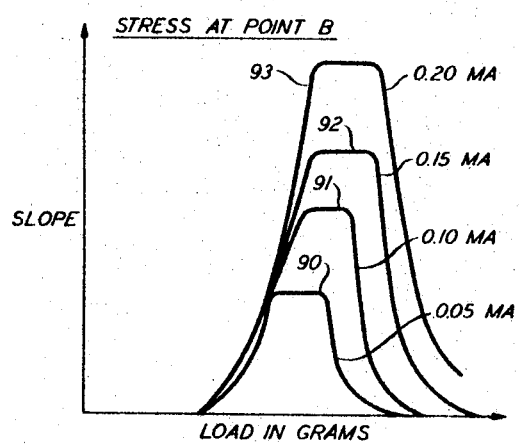
FIG. 8 illustrates the slope versus lead characteristics of a transistor for the situations represented by FIG. 7.

In FIG. 8 curves 90 through 93, inclusive, show the slopes of curves 80 through 83 inclusive, respectively, of FIG. 7 as the load is increased. As for FIG. 7, the indenter 11 of FIG. 1 is located at point B of FIG. 2A.

It is apparent from FIG. 8 that where the transistor develops appreciable sensitivity only if the load exceeds, a particular minimum value as indicated by the characteristics 40, 42 and 44 of FIG. 3, the transistor should be prestressed by a static load corresponding to approximately the midpoint of the flat horizontal portion of the slope curve on which it is operating (determined of course by the base current $I_B$, curves 90 through 93), inclusive, corresponding to base currents $I_B$ of 0.05, 0.10, 0.15 and 0.20, respectively, as indicated in FIG. 8), since the flat horizontal tops of curves 90 through 93, inclusive, indicate, obviously, a constant maximum value of the slope in each instance. Accordingly, if prestressed to substantially the center of the flat top of the applicable curve, sinusoidally varying acoustic or ultrasonic energy, or the like, superimposed upon the steady prestress will be reproduced with minimum distortion and maximum amplitude.

It should be noted with particular care that the desirable amount of prestress is determined by the sensitivity of the transistor, the curves of FIG. 8 corresponding to the sensitivity for the indenter at position B. Obviously, for the indenter at positions A, E or F, only slight, if any, prestress should be used while for points C and D much larger prestress should be employed.

Figure 9:
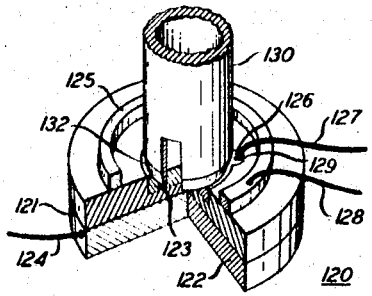
FIG. 9 illustrates the use of peripheral pressure on the emitter junction of a transistor of circular configuration.

In FIG. 9 a transistor 120 of circular configuration is shown in a partially cross-sectional view, approximately a quarter of the assembly having been removed to show the internal structure. As noted above in connection with the showing of FIG. 1, the transistor of FIG. 9 is also shown to a greatly enlarged scale.

The transistor comprises a circular collector portion 122, a circular base portion 121 and a circular emitter portion 123, the latter being diffused, for example, into the base portion 121 and having a small "tab" portion 129 upon which a small metallic terminal 126 has been deposited. An electrical lead 127 is connected to terminal 126. Base portion 121 has a metallic ring terminal 125 deposited on its upper surface between the edge of the emitter region 123 and the outer edge of the base portion 121. An electrical lead 128 is connected to ring terminal 125. An electrical lead 124 makes an ohmic contact with the collector portion 122. A cylindrical indenter 130 shaped to a knife edge 132 at its lower end is used to apply stress closely adjacent to substantially the entire periphery of the upper surface of the emitter region 123, as illustrated.

Figure 10:
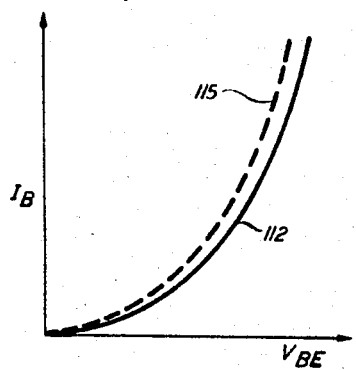
FIG. 10 illustrates the effect of peripheral pressure applied as indicated in FIG. 9 to the emitter region on the base current versus base-to-emitter voltage characteristic of a transistor.

In FIG. 10 curve 112 represents the base current $I_B$ versus the base-to-emitter voltage $V_{BE}$ characteristic of the transistor strtucture of FIG. 9 for the condition of no stress being applied by indenter 130. Curve 115 represents the same characteristics as changed by the application of a particular stress by indenter 130. As shown in FIG. 10 curve 115 maintains a moderate but substantially constant separation from curve 112 to relatively large values of base current $I_B$ which indicates that the structure of FIG. 9 is suitable for operation at relatively high power levels, though its sensitivity is but moderate.

Figure 11:
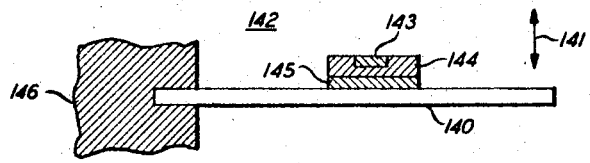
FIG. 11 illustrates a prior art method and structure for stressing a transistor on a cantilever arm.

In FIG. 11 an arrangement suggested previously (see, for example, my above-mentioned joint application) for stressing a transistor is shown. It comprises a transistor 142 shown in a cross-sectional view mounted on a cantilever spring 140. Spring 140 is firmly supported at its left end by fixed support 146 and the transistor is stressed by applying vertical forces, represented by the double-headed arrow 141 to the right end of spring 140. Thus a downwardly directed force will subject the entire transistor to tension and an upwardly directed force will subject the entire transistor to compression. The transistor 142 comprises a base portion 144 into which an emitter portion 143 extends (produced for example by diffusion) and a collector portion 145 forming a p-n junction with the lower major surface of the collector portion 144 opposite and substantially parallel with the lower surface of emitter portion 143, as shown. In FIG. 11 and in the related showing of FIG. 13 metallic terminals and electrical connections for the transistor have been omitted to simplify the showings but any of numerous terminal and electrical connection arrangements well known and extensively used by those skilled in the art, as for example, described hereinabove in connection with other arrangements of the invention may be used with the transistors of FIGS. 11 and 13.

Figure 12:
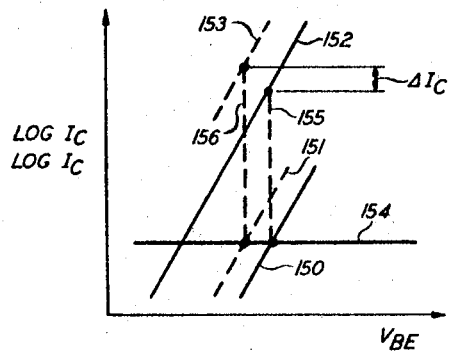
FIG. 12 illustrates in a partial showing the relative changes in the logarithms of the base and collector currents for a transistor stressed by the arrangement of FIG. 11.

In FIG. 12 line 150 represents the logarithm of the base current $I_B$ versus base-to-emitter voltage $V_{BE}$ characteristic of the transistor 142 of FIG. 11 with no force applied to the right end of spring 140. Line 152, similarly, represents the logarithm of the collector current $I_C$ versus base-to-emitter voltage $V_{BE}$ characteristic of transistor 142 of FIG. 11 with no force applied to the right end of spring 140.

With a particular steady unidirectional force 141 applied to the right end of spring 140 of FIG. 11, characteristic 150 of FIG. 12 may move, for example, to the position of line 151 and characteristic 152 will move in the same direction, that is, to the left, as for example, to the position of line 153. Assuming constant current operation, as indicated by line 154 (that is, a circuit having a high impedance power supply; for example, a high impedance for source 51 in a circuit as shown in FIG. 4) and projecting the points of intersection of characteristic 150 and line 154 and characteristic 151 and line 154 vertically as shown by the vertical dashed lines 155 and 156, respectively, until they respectively intersect characteristic 152 and characteristic 153, respectively, as shown, a vertical distance designated $\Delta I_C$ is obtained which is representative of the net change in the collector current $I_C$ effected by the combined reactions to the stress of the emitter-base and collector-base junctions. Should the direction of the steady force 141 applied to the right end of spring 140 of FIG. 11 be reversed in direction but maintained at the same amplitude, then characteristics 150 and 152 would both move toward the right by substantially the same respective amounts as they are shown in FIG. 12 to have moved toward the left. The net charge $\Delta I_C$ in collector current $I_C$ would be of like relatively small amplitude but in the opposite direction.

From an analysis of the above-described results it is apparent that when the entire transistor, including all parts of both junctions, is stressed in the same sense the characteristics of collector current versus voltage BE and of base current versus voltage BE are displaced in the same direction in response to the stress. Furthermore, the direction of these displacements is reversed when the direction of the stress is reversed.

The above-described and related test results led applicant to conclude that a very appreciably greater net change in the collector current $I_C$ could be effected if it could be arranged to stress the base collector junction and the innermost surface of base emitter junction in one direction (that is, either in tension or compression) and the remainder of the base emitter junction, that is, principally the vertical sides of the emitter portion of the transistor, in the opposite direction (that is, in compression or tension, respectively) rather than stressing every portion in substantially the same direction as for the priorly suggested arrangement of FIG. 11.

Figure 13:
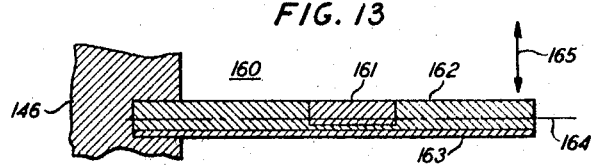
FIG. 13 illustrates a method and structure of the invention for stressing a transistor on a cantilever arm.

Accordingly, a relatively long slender cantilever arm 160 consisting completely of a semiconductive material was arranged as indicated in FIG. 13. The left end of arm 160 is firmly held by rigid support 146. The base portion 162 has an emitter portion 161 situated intermediate the ends along its longitudinal axis and extending into the base portion 162 from its upper surface nearly to its lower surface, as shown. A thin collector portion 163 defines between its upper surface and the lower surface of base portion 162 a base collector junction. The assembly 160 is proportioned so that its neutral plane indicated, for example, by line 164 (that is, the plane in which bending by application of a force 165 normal to the right end of the member produces substantially zero stress) lies above the lower surface of emitter portion 161. Alternatively, the lower surface of emitter portion 161 can lie in the neutral plane and will be under little if any stress as a result of bending the assembly 160 vertically.

With the arrangement of FIG. 13, as shown for a downwardly directly steady unidirectional force 165, the bottom part of the emitter portion and the base collector junction are subjected to compression while the upper part of the emitter portion is subjected to tension, and vice versa for an upwardly directed steady unidirectional force 165. As for other showings of transistor structures in this application, a greatly enlarged scale has been used in FIG. 13. Arrow 165 may represent forces derived from an acoustically actuated diaphragm, or from a phonograph pickup device, or the like.

Figure 14:
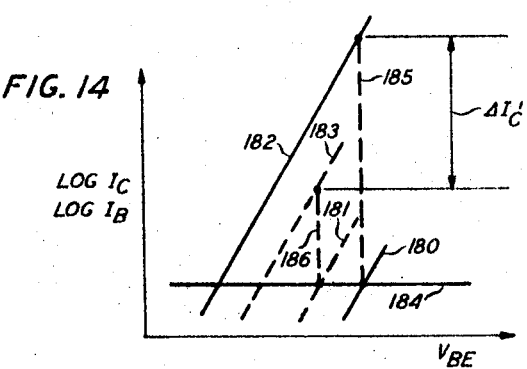
FIG. 14 illustrates the relative changes in the logarithms of the base and collector currents for a transistor stressed by the arrangement of FIG. 13.

In FIG. 14 the effect upon the over-all response of the device is apparent. The no-stress characteristics are for log $I_B$ versus $V_{BE}$, the solid line 180 and for log $I_C$ versus $V_{BE}$, the solid line 182.

A particular static force 165 applied to the right end of assembly 160 will now cause characteristic 180 to move to the left, for example, to the dashed line 181, but will cause characteristic 182 to move to the right, for example, to the dashed line 183, so that the net change in collector current $\Delta I'_C$, as indicated by the intersections of vertical lines 185 and 186 from load line 184 with characteristics 182 and 183, respectively, is substantially greater than the net change $\Delta I_C$ obtained with the arrangement of FIG. 11 as illustrated in FIG. 12.

A reversal of the direction only of the static force 165 will reverse the respective directions only in which characteristics 180 and 182 will be displaced and again substantially the same net change of $\Delta I'_C$ will result. It is therefore apparent that an arrangement of the type illustrated in FIG. 13 provides a much larger current change than prior art arrangements such as that shown in FIG. 11 and described in detail above.

Figure 15:
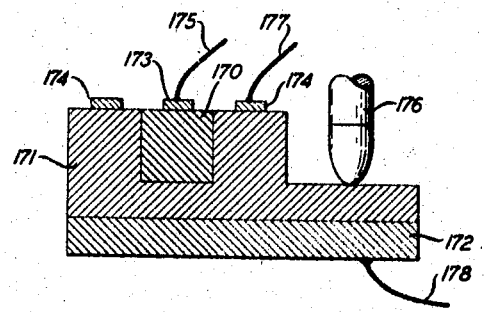
FIG. 15 illustrates a method and structure of the invention for applying a stress to the collector junction of a transistor.

In FIG. 15 a further arrangement of the invention is illustrated in which the base portion or region 171 has been "necked down" at the right, as shown, and indenter 176 is employed to exert a vertical force on the collector junction between base 171 and collector region 172 through the thinner portion of region 171. The emitter region 170, metal contact or terminal members 173 and 174, electrical leads 175, 177 and 178 may all be of conventional forms as for corresponding features of transistor structures described hereinabove.

Figure 16:
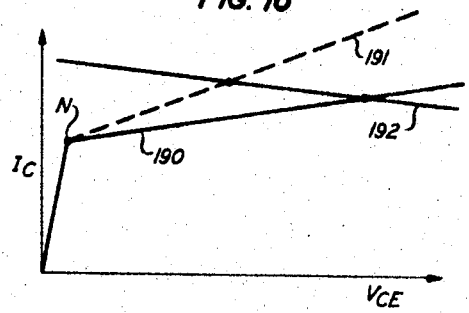
FIG. 16 illustrates the effect upon the collector current versus the collector-to-emitter voltage characteristic of a transistor when stressed by the arrangement of FIG. 15.

In FIG. 16 the collector current $I_C$ versus collector-to-emitter voltage $V_{CE}$ characteristic of the structural arrangement of FIG. 15 is illustrated, curve 190 being the characteristic for no stress applied by member 176 and curve 191 being the characteristic for a particular stress. A load line such as 192 may be determined then, as is well known to those skilled in the art, by appropriate choice of the parameters of the circuit in which the device of FIG. 15 is used. Thus the structure of FIG. 15 is obviously capable of producing sizeable changes in $V_{CE}$ in response to stress.

Figure 17:
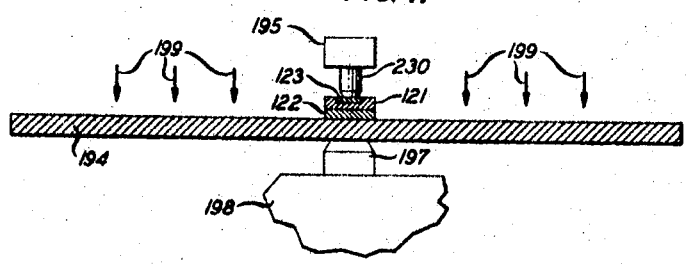
FIG. 17 illustrates a method and structure of the invention for statically prestressing a translator and applying superimposed acoustic signals of substantially sinusoidal characteristics to the prestressed transmitter.

In FIG. 17 a further arrangement of the invention is illustrated in which the transistor comprising emitter region 123, base region 121, collector region 122 and electrical connections to those several portions can be substantially as previously described in connection with the arrangement of FIG. 9 hereinabove. Corresponding details have been given corresponding designation numbers. Details too small to illustrate at the reduced, more nearly to size, scale at which the transistor is shown in FIG. 17 can be as shown for the appropriate correspondingly numbered features of the greatly enlarged scale showing of FIG. 9.

The transistor of the arrangement of FIG. 17 is assembled on the central portion of a circular diaphragm 194. The diaphragm 194 is, as illustrated, of much larger diameter than the transistor. It may be of metal or any suitably resilient material. The assembly is centrally supported, being in effect clamped between the stress applicator 230 and the pedestal 197. Stress applicator 230, by way of specific examples, may be of the type arranged to stress the periphery of the emitter region substantially as described for element 130 in connection with FIG. 9 or, alternatively, it may be an indenter such as member 11 of FIG. 1, preferably positioned closely adjacent to an edge of the emitter surface, as for positons A and E of FIG. 2A or F of FIG. 2B. Pedestal 197 may rest on a rigid supporting surface 198, by way of example. A load 195 is chosen of such weight as to statically prestress the transistor to substantially the median point of its region of constant and maximum slope, as discussed hereinabove in connection with the characteristics of FIG. 8. The large circular diaphragm 194 is adapted to respond to acoustic waves indicated by arrows 199 and in response to such waves to superimpose corresponding mechanical vibrations on the static prestresses, above mentioned, on the transistor located centrally upon diaphragm 194. The arrangement of FIG. 17 represents a sensitive transistorized sound "pick-up" device. Suitable electrical connections to an appropriate circuit, not shown, can of course be made in conventional manner as is well understood by those skilled in the art.

Figure 18:
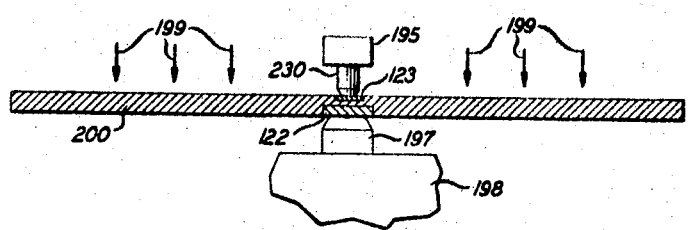
FIG. 18 illustrates a further method and arrangement of the invention for prestressing a transistor and superimposing acoustic signals thereon.

An even more sensitive arrangement of the general type illustrated in FIG. 17 can be made as illustrated in FIG. 18, by employing a diaphragm 200 of semiconductive material and "building" the transistor into the center of the diaphragm 200 in the general manner exemplified by the structure of FIG. 13. In FIG. 18 a circular diaphragm 200 of semiconductive material has at its center an emitter region 123, induced into the upper surface and a collector region 122 induced at the opposite lower surface in any of several manners well known in the art. The depth of the emitter region 123, that is, its penetration into the diaphragm 200, is such that the neutral plane or "no-stress" plane for flexure of the diaphragm 200 is above the lower surface of the emitter region. The portion of diaphragm 200 adjacent the emitter and collector regions can, of course, be made to function as the base region of the "built-in transistor." Other details of the arrangement of FIG. 18 can be substantially as described for that of FIG. 17 and are given corresponding designation numbers. In the structure of FIG. 18, the advantages described in detail above in connection with FIGS. 13 and 14 can obviously be realized.

The four structures of FIGS. 19 through 22, inclusive, are illustrative of a very large class of structures sometimes designated as "stress-raisers." Such structures received attention first in the analysis of stress for design purposes. (See, for example, FIGURES 6.8 and 6.9, pages 165 and 166, respectively, of the book entitled "An Introduction to Experimental Stress Analysis," by G. H. Lee, John Wiley & Sons, Inc., New York, 1950, and the book entitled "Theory of Elasticity," by S. Timoshenko and J. N. Goodier, McGraw-Hill Book Company, Inc., New York, 1951.

With stresses applied as indicated by the two-headed arrows 210, portions of the structures of FIGS. 19 through 22, inclusive, in the general areas designated by the letter A, will be subjected to several times the stress applied at the points indicated by the arrows. As is further well known in the art, the "stress-raiser" structures such as those illustrated in FIGS. 19 through 22, inclusive, also have portions in which minimum or substantially no stress occurs when loaded as indicated in the drawing. Such portions are frequently referred to as "neutral planes" or regions, and, of course, correspond to the like designated planes of simple beams. By way of example, in FIGS. 19 and 20 neutral planes or minimum stress regions will occur substantially along the lines designated B. Similarly, portions C on the opposite sides of regions B of FIGS. 19 and 20 will have relatively high stresses of the opposite type to those occurring at any instant at portions A, that is, tension in place of compression and vice versa.

Accordingly, structures of the "stress-raiser" type can obviously be made of semiconductive material and emitter regions induced at the portions A will be subjected to stresses of several times those applied to the structures as indicated by the arrows. Similarly, the collector regions may be situated at portions such as portions C where they will be subjected to the opposite type of stress from that at portion A at any particular moment.

Figure 19:
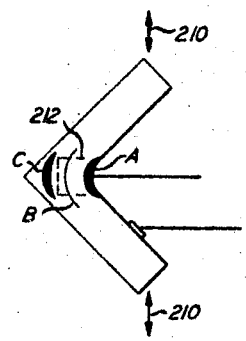
Figure 20:
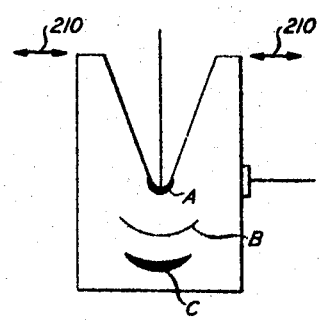
Figure 21:
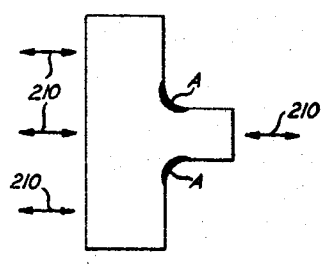
Figure 22:
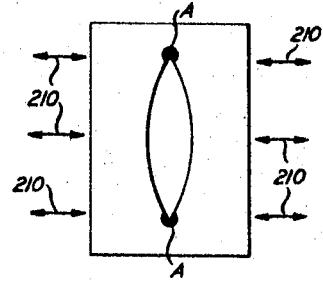

Preferably, when transistors are built into stress-raising members, the over-all dimensions of the stress-raiser members and the depth or thickness of the induced emitter regions should be proportioned so that the bottom or innermost surface of the emitter regions is on the same side of the neutral plane C as the collector region, as illustrated, for example, by the broken line 212 of FIG. 19, in order that the advantages illustrated in FIGS. 13 and 14 and described in detail above may be realized in addition to the enhancement of stress by use of the stress-raiser structure employed.

Stress-raiser structures can also obviously be employed in the fabrication of diodes and tunnel diodes in which case the single junction of the diode is preferably placed at a portion developing maximum stress, that is, at one of the points A of the structures of FIGS. 19 through 22, inclusive.

In FIG. 23 a circuit well adapted for use with a stress-responsive transistor "microphone" or the like is illustrated, since it provides a low impedance output under control of variable resistor 308 without requiring the use of an output transformer. The arrow F represents the applied force which may, for example, preferably comprise a prestress sufficient to "bias" the p-n collector junction of transistor 310 into approximately the center of its more sensitive range (that is, the range of maximum slope, see FIG. 8). Superimposed on the prestress may be, for example, the stress variations of an acoustic wave or the like.

The circuit of FIG. 23 is obviously of the well known grounded-emitter type. The emitter-to-base circuit comprises voltage bias source 300 in series with resistor 302. The emitter-to-collector circuit comprises voltage bias source 304 in series with the load impedance 306. A variable resistor 308 interconnecting the collector and base connections of transistor 310 provides a control of the volume and also of the output impedance of the transistor without, as mentioned above, requiring the use of an output transformer. Alternatively, battery 300 can be omitted and the lower end of resistor 302 can be connected to the upper terminal of battery 304. This affords a single battery circuit at some sacrifice of independent control of the base-emitter circuit.

Numerous and varied modifications and rearrangements of the above-described specific illustrative embodiments can readily be devised by those skilled in the art without departing from the spirit and scope of the principles of the invention.

What is claimed is:
1. A device comprising:
   a diaphragm of semiconductive material of a specified conductivity type;
   a transistor occupying a small central portion of the diaphragm and comprising base-collector and base-emitter junctions consisting of said diaphragm and of semiconductive material opposite in conductivity type thereto, said junctions being concentrically aligned with the vertical through the diaphragm centerpoint; and
   means for applying a static stress to said transistor parallel to said vertical and concentrated at the edges of said emitter-base punction, said means also supporting said diaphragm for flexural vibration about its center.

2. A device pursuant to claim 1, wherein said diaphragm is circular and wherein the innermost surface of the emitter region and said base-collector junction are on one side of a plane in which said flexural vibration of said diaphragm produces substantially no stress, and the remainder of said emitter is on the other side of said plane.

3. A device pursuant to claim 2, wherein said static stress-applying means further comprises means for prestressing said transistor for operation in predetermined ranges of sensitivity and linearity.

References Cited

UNITED STATES PATENTS

| | | | |
|---|---|---|---|
| 2,497,770 | 2/1950 | Hanson | 179—121 |
| 2,632,062 | 3/1953 | Montgomery | 179—121 |
| 2,929,885 | 3/1960 | Mueller | 179—121 |
| 3,144,522 | 8/1964 | Bernstein | 179—100.41 |
| 3,236,957 | 2/1964 | Karmann et al. | 179—110 |
| 3,266,303 | 8/1966 | Pfann | 73—141 |

JOHN W. HUCKERT, *Primary Examiner.*

J. R. SHEWMAKER, *Assistant Examiner.*

U.S. Cl. X.R.

179—110